Patented Dec. 24, 1929

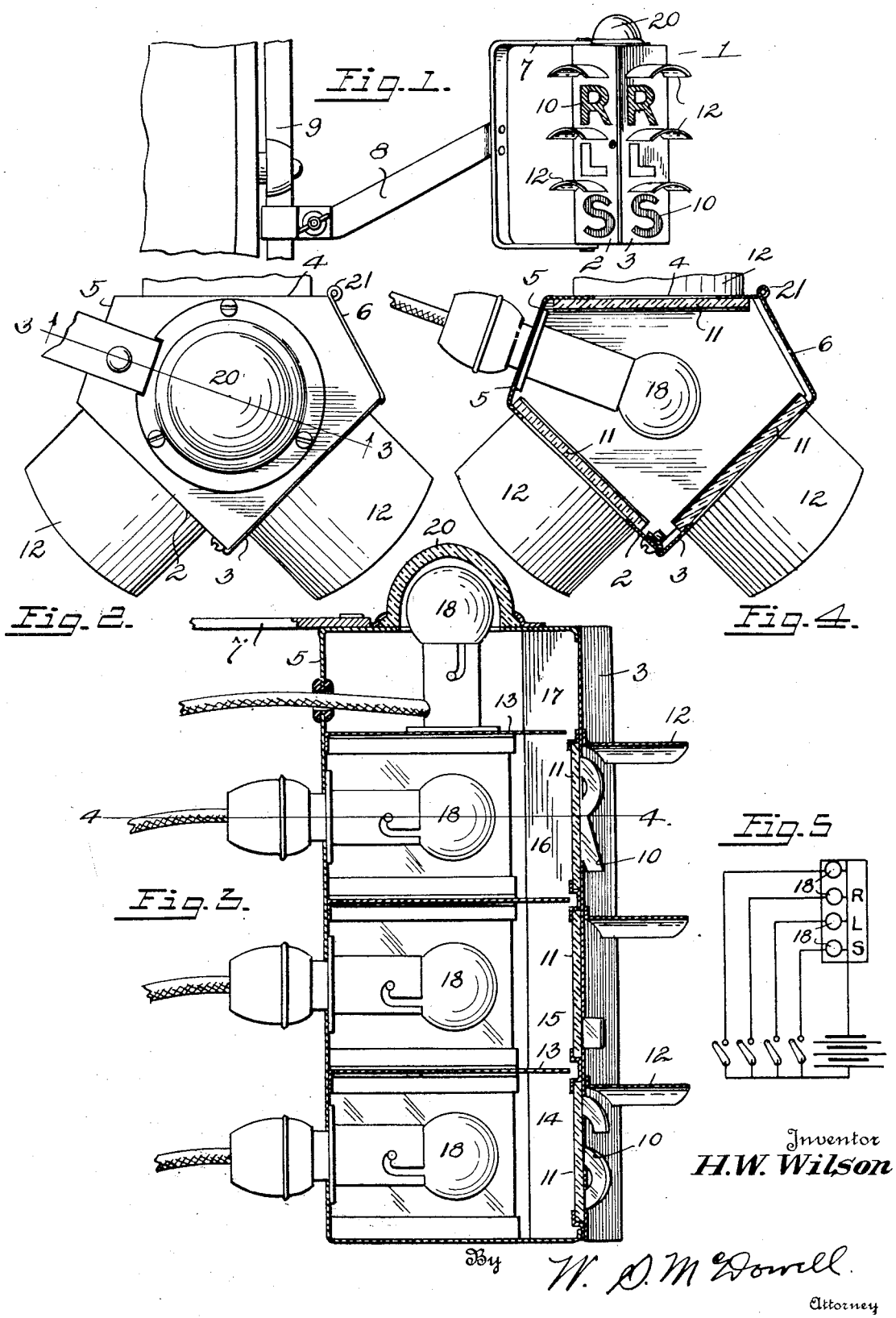

1,740,637

UNITED STATES PATENT OFFICE

HORATIO W. WILSON, OF WASHINGTON C. H., OHIO

VEHICLE SIGNAL LAMP

Application filed February 16, 1926. Serial No. 88,661.

This invention relates to improvements in signal lamps for motor vehicles, and has for its object the provision of a novel form of signal lamp adapted to be formed to project from the left side of a motor vehicle wind shield and so constructed as to include a plurality of signaling faces capable of being viewed from both the front, sides and rear of the associated vehicle.

For a further understanding of the invention reference is to be had to the following description and accompanying drawing in which:

Figure 1 is a front elevation of a motor vehicle signal lamp constructed in accordance with the invention, Figure 2 is a top plan view thereof, Figure 3 is a vertical longitudinal sectional view taken on the plane indicated by the line 3—3 of Figure 2, Figure 4 is a horizontal sectional view on the line 4—4 of Figure 3, Figure 5 is a diagrammatic view of the electric circuits employed.

Referring more particularly to the drawings the numeral 1 designates my improved signal lamp in its entirety, the same consisting of a sheet metal casing formed to comprise a pair of forwardly converging front walls 2 and 3, a rear wall 4, arranged in a vertical plane perpendicular to the longitudinal center line of the associated motor vehicle, so that said rear wall may be clearly viewed from the back of the vehicle, and connecting walls 5 and 6, arranged in angular relation with respect to the walls 2, 3 and 4. Connected with the casing is a bracket 7 which includes an arm 8 adapted to be mounted in fixed relationship with respect to the wind shield frame 9 of the vehicle. By the construction and mounting disclosed it will be observed that a single lamp is provided viewable from all adjacent areas of the vehicle upon which the lamp is mounted. That is, due to the converging front walls 2 and 3 the latter are capable of being readily viewed from the front as well as the sides of the vehicle and, similarly, the rear wall 4 by reason of its disposition may be clearly discerned from the rear of the vehicle.

These walls are provided with signal indicia, indicated at 10. In this instance the letters S—L—R being employed to indicate respectively, Slow, Left and Right, providing all necessary instructions by which surrounding persons may know the future or intended course which the vehicle is to follow. These letters are preferably formed by slotting or perforating the walls 2, 3 and 4 and then in placing to the rear of such perforations variously colored glass panels 11, so that each signal will have a characteristic color. To enable the signal to be readily viewed during day-light periods, the walls 2, 3 and 4, immediately over the vertically arranged rows of letters are provided with hoods 12, which tend to throw a shadow on said letters so as to make the same visible and distinct when illuminated from within the casing.

This illumination may be effected in any desired manner, but in the present instance the interior of the lamp is provided with a plurality of horizontally arranged partitions 13, by which the interior of the lamp is divided into compartments 14, 15, 16 and 17, each of which contains a source of light in the form of an incandescent lamp 18. As shown in Figure 5 each lamp involves an independent circuit capable of being opened and closed by manually operated switches 19, which are arranged adjacent the vehicle driver so that the said signals may be selectively operated from within the vehicle.

The upper compartment 17 in this instance has its top wall provided with a lens 20 which when illuminated provides a parking light enabling the extreme left of the vehicle to be clearly discerned by passing motorists. The walls 3 and 6 in this instance have been formed to constitute a door, hinged as at 21 upon the casing of the lamp, and it will be seen that when the door is opened the bulbs or lamps 18 are readily accessible for repair or replacement purposes. Moreover to accomplish this it is not necessary to remove any of the transparent panels 11, since the latter are securely carried by the door and are out of the way when bulb replacement takes place.

In view of the foregoing it will be seen that the present invention provides a simple and effective form of signal lamp for motor vehicles by which through the agency of but a single lamp, adequate and readily viewed signals may be given to those in front, to the sides and rear of the vehicle as to the intended course which the vehicle will follow, enabling the progress of a vehicle to be determined with accuracy and preventing or minimizing vehicular collisions and accidents due principally to the ignorance of drivers or persons with regard to the intended paths of travel of an oncoming vehicle.

What is claimed is:

A signal lamp of the character described comprising a casing pentagonal in section formed with three walls having windows and two opaque walls, one of said walls having windows being disposed at the rear of said casing, the other two walls having windows being disposed in converging relation at the front of said casing, lamps carried on the inner side of one opaque wall, said wall extending between one converging front wall and the rear wall and the other opaque wall disposed between the other converging front wall and the rear wall to make the casing symmetrical, said opaque wall and adjoining converging front wall being formed integral and hinged to said rear wall.

In testimony whereof I affix my signature.

HORATIO W. WILSON.